United States Patent Office.

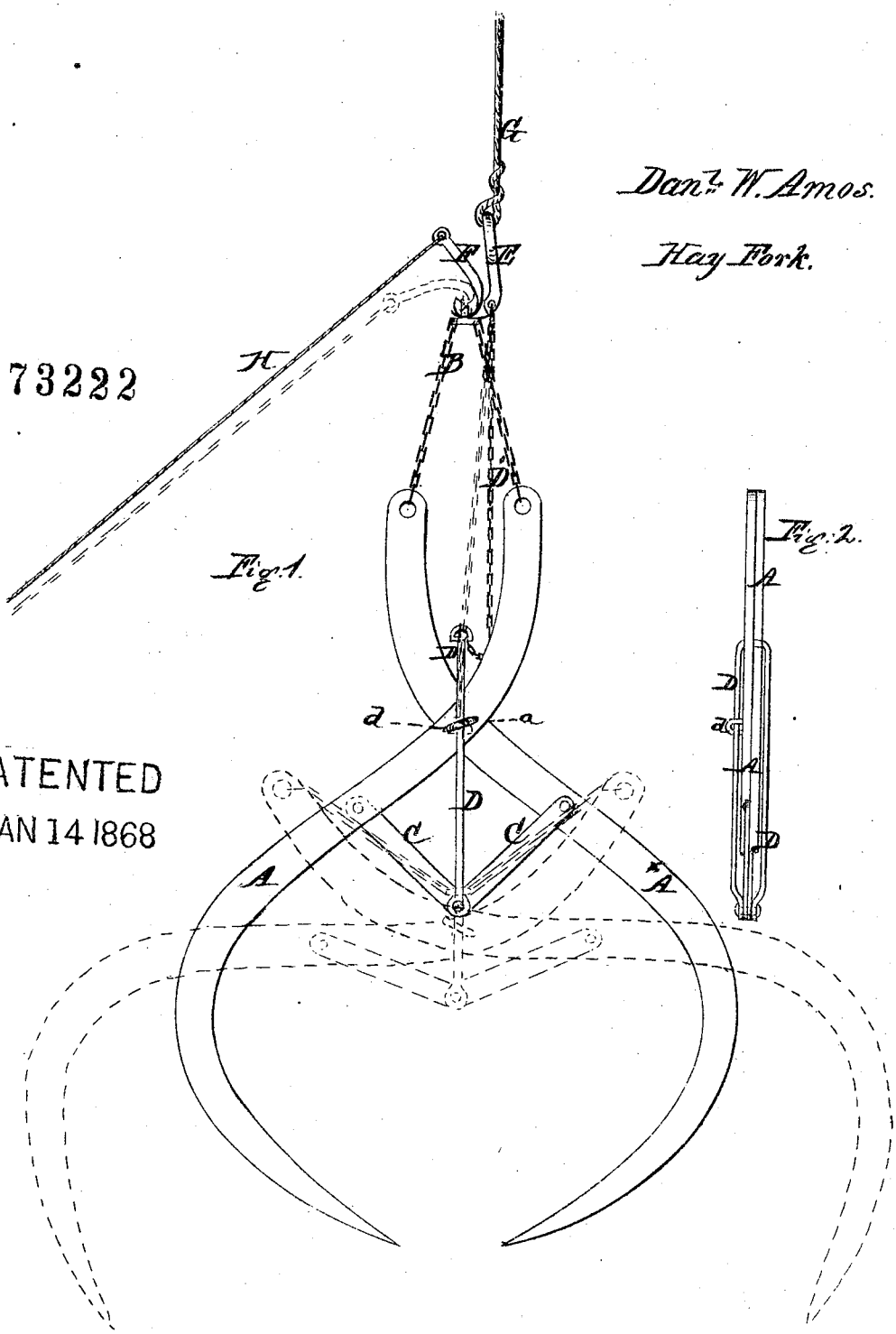

DANIEL W. AMOS, OF BROAD TOP CITY, PENNSYLVANIA.

Letters Patent No. 73,222, dated January 14, 1868.

IMPROVEMENT IN HORSE HAY-FORKS.

The Schedule referred to in these Letters Patent and making part of the same.

TO ALL WHOM IT MAY CONCERN:

Be it known that I, DANIEL W. AMOS, of Broad Top City, in the county of Huntingdon, and State of Pennsylvania, have invented a new and useful Improvement in Hay-Forks, of which the following is a full, clear, and exact description, reference being had to the accompanying drawing, which makes part of this specification, and in which—

Figure 1 shows a view in elevation of my improved hay-fork in two positions. The black lines show the attitude of the parts when lifting the hay, and the red lines their attitude when descending to grasp the hay.

Figure 2 shows a side view of a part of the same.

To carry out my invention, I pivot two sickle-shaped prongs or tines, A, at a point, $a$, about one fourth of their length from their upper ends, so that the tines shall move in planes parallel to each other, and connect their upper ends by a hoisting-chain, B. The tines are connected below the joint $a$ by two link-rods, C, pivoted to and moving parallel with the tines, and pivoted at their inner ends to a link, D, which embraces the joint of the tines, and extends above it between the upper parts of the tines, being kept in place by a loop, $d$. A cord or chain, D', extends upward from this link to a hook, E, to which a tripping-latch, F, is pivoted, as shown in the drawing.

The operation is as follows: The hook E is suspended above the hay by a cord or chain, G. As the fork is lowered into the hay it is suspended by the chain D', which holds it in the position shown in red in the drawings. When the tines A have entered the hay, the hoisting-chain B is hooked over the tripping-latch F, and the fork hoisted by drawing on the rope G. As the fork rises, its tines approach and grasp the hay, assuming the attitude shown in black lines in the drawing. The bundle is then swung over the place of deposit and dropped by pulling the tripping-cord H, which releases the hoisting-chain B, and allows the tines to open and drop the load. The fork is now suspended by the link D, which draws on the link-rods C, and spreads the prongs, as shown in red, when the above-described operation is repeated. It is obvious that the tines might be furnished with several prongs.

What I claim as my invention, and desire to secure by Letters Patent, is—

1. The combination, substantially as described, of pivoted tines A, link-rods C, and a spreading-link, D, with a tripping-latch and hoisting-chain, B, for the purpose set forth.

2. The arrangement, as described, of the link-rods C, below the joint of the tines, whereby the fork is opened by its own weight in descending.

In testimony whereof, I have hereunto subscribed my name.

DANIEL W. AMOS.

Witnesses:
 WESLEY M. AKERS,
 ANDREW J. BAKER.